United States Patent [19]

Kay et al.

[11] Patent Number: 5,525,440
[45] Date of Patent: Jun. 11, 1996

[54] METHOD FOR THE MANUFACTURE OF A PHOTO-ELECTROCHEMICAL CELL AND A CELL MADE BY THIS METHOD

[75] Inventors: Andreas G. Kay, Lausanne; Michael Graetzel, St. Sulpice, both of Switzerland; Brian O'Regan, Seattle, Wash.

[73] Assignee: Ecole Polytechnique Federale de Lausanne (EPFL), Lausanne, Switzerland

[21] Appl. No.: 140,098

[22] PCT Filed: Mar. 9, 1993

[86] PCT No.: PCT/CH93/00060

§ 371 Date: Nov. 2, 1993

§ 102(e) Date: Nov. 2, 1993

[87] PCT Pub. No.: WO93/18532

PCT Pub. Date: Sep. 16, 1993

[30] Foreign Application Priority Data

Mar. 11, 1992 [DE] Germany .......................... 42 07 659.5

[51] Int. Cl.[6] .......................................... H01M 6/36
[52] U.S. Cl. .................. 429/111; 205/50; 205/57; 205/109; 205/162; 205/224; 427/74; 427/75; 427/180; 427/190; 427/372.7; 427/376.2
[58] Field of Search ..................... 429/111; 427/74–75, 427/180, 190, 372.2, 376.2; 205/50, 57, 109, 162, 224

[56] References Cited

U.S. PATENT DOCUMENTS

| 4,654,467 | 3/1987 | Yamazaki | 136/251 |
| 4,927,721 | 5/1990 | Gratzel et al. | 429/111 |
| 5,350,644 | 9/1994 | Graetzel et al. | 429/111 |

FOREIGN PATENT DOCUMENTS

WO91/16719 10/1991 WIPO ................................ 429/111

OTHER PUBLICATIONS

O'Regan, B. and Grätzel, M., "A Low–Cost, High–Efficiency Solar Cell Based on Dye–Sensitized Colloidal $TiO_2$ Films," *Nature*, vol. 353, No. 6346, 24 Oct. 1991, pp. 737–740.

*Primary Examiner*—Aaron Weisstuch
*Attorney, Agent, or Firm*—Clifford W. Browning; Woodard, Emhardt, Naughton, Moriarty & McNett

[57] ABSTRACT

Method for the manufacture of a photoelectrochemical cell and a cell made by this method. A disadvantage of such cells (1) is the fact that their efficiency is not sufficient for economic use. It is therefore the aim of the invention to avoid this disadvantage. The method according to the invention makes it possible to produce a photoelectrochemical cell (1) comprising a porous electrode (4), the effective surface of which is by a factor 700 greater than that of electrodes of comparable size.

14 Claims, 1 Drawing Sheet

METHOD FOR THE MANUFACTURE OF A PHOTO-ELECTROCHEMICAL CELL AND A CELL MADE BY THIS METHOD

FIELD OF THE INVENTION

The invention relates to a method for the manufacture of a photoelectrochemical cell and a cell made by this method.

BACKGROUND OF THE INVENTION

It is known from EP 0 333 641 A1 that semiconductor electrolyte interfaces show photoelectrochemical properties which are similar to those of interfaces between a semiconductor and a metal in Schottky barriers. Semiconductors having a small distance between energy band and valence band in which charge carriers of the semiconductor are themselves photoelectrically excited by light, as is the case, for instance, with silicon, gallium arsenide and cadmium sulphide, are photocorrosively decomposed when illuminated by light when electrolytes are used. The sensitivity, i.e. the photochemical yield for visible light, i.e. sunlight, may be increased in that so-called chromophores, called also sensitizers or dyes, are chemically added or inserted on the surface of the semiconductor. The two functions of the light absorption and separation of charge carriers are separate in this photoelectrochemical system. The light absorption is taken over by chromophore in the surface region and the separation of the charge carriers takes place at the interface of the semiconductor and chromophore. For instance iodide, bromide or hydroquinone or other redox systems are suitable as electrolytes for such photoelectrochemical cells. As electrodes, there are used metal-oxide semiconductors. For this purpose particularly suitable are oxides of transition metals and elements of the third main group and of the fourth, fifth and sixth subgroups of the periodic table of elements, such as titanium, zirconium, hafnium, strontium, zinc, indium, yttrium, lanthanum, vanadium, niobium, tantalum, chromium, molybdenum, tungsten and also oxides of zinc, iron, nickel or silver, perovskite or oxides of other metals of the second or third main groups or mixed oxides or oxide mixtures of these metals. The use of titanium dioxide as an electrode was shown to be advantageous. However, the efficiency of cells with electrodes of titanium dioxide is below the limit for economical operation.

SUMMARY AND OBJECT OF THE INVENTION

The aim of the invention is to provide a method for the manufacture of a photoelectrochemical cell having a titanium dioxide electrode which has an improved efficiency, compared with the state of the art, and also a cell having these properties.

It is possible, using the method according to the invention, to increase the effective surface of the electrode by a factor of 700 compared with known cells having the same dimensions. This provides a photoelectrochemical cell the efficiency of which is greater than 7%. For the formation of the electrode a titanium dioxide dispersion is prepared. For that a titanium dioxide powder is used, which is produced by flame hydrolysis from titanium(IV) chloride. The dispersion is made from the powder by the addition of a solvent. While mixing the powder and the solvent, the powder is continuously comminuted until a viscous paste is obtained. In addition, acids, bases and/or chelating agents are added to the dispersion to ensure that an electrostatically and sterically stabilized dispersion of particles is obtained. The titanium dioxide dispersion may be applied directly onto a conductive glass delimiting the cell. But according to the invention a diffusion barrier in the form of a non-porous titanium oxide layer is first applied onto the surface of the conductive glass. In order to simplify the application of the dispersion, an anionic, cationic or non-ionic detergent is added. Finally the titanium oxide dispersion is applied and the solvent is removed by heat treatment. To further increase the effective surface of the electrode layer, additional titanium oxide is applied onto the colloidal particles of the porous layer. This coating is so made, that also the inner surfaces of the pores obtain a coating. This can be achieved in that the porous titanium dioxide layer is treated with a solution containing a hydrolysable titanium compound. Deposition of the titanium may be performed electrically. The porous titanium dioxide layer may further be additionally coated also by hydrolysis, oxygenolysis or pyrolysis with a gaseous titanium compound.

BRIEF DESCRIPTION OF THE DRAWING

The invention will now be explained in greater detail with the help of FIG. 1, which is a cross-sectional diagrammatic drawing.

DETAILED DESCRIPTION OF THE PREFERRED EMBODIMENT

Figure 1:
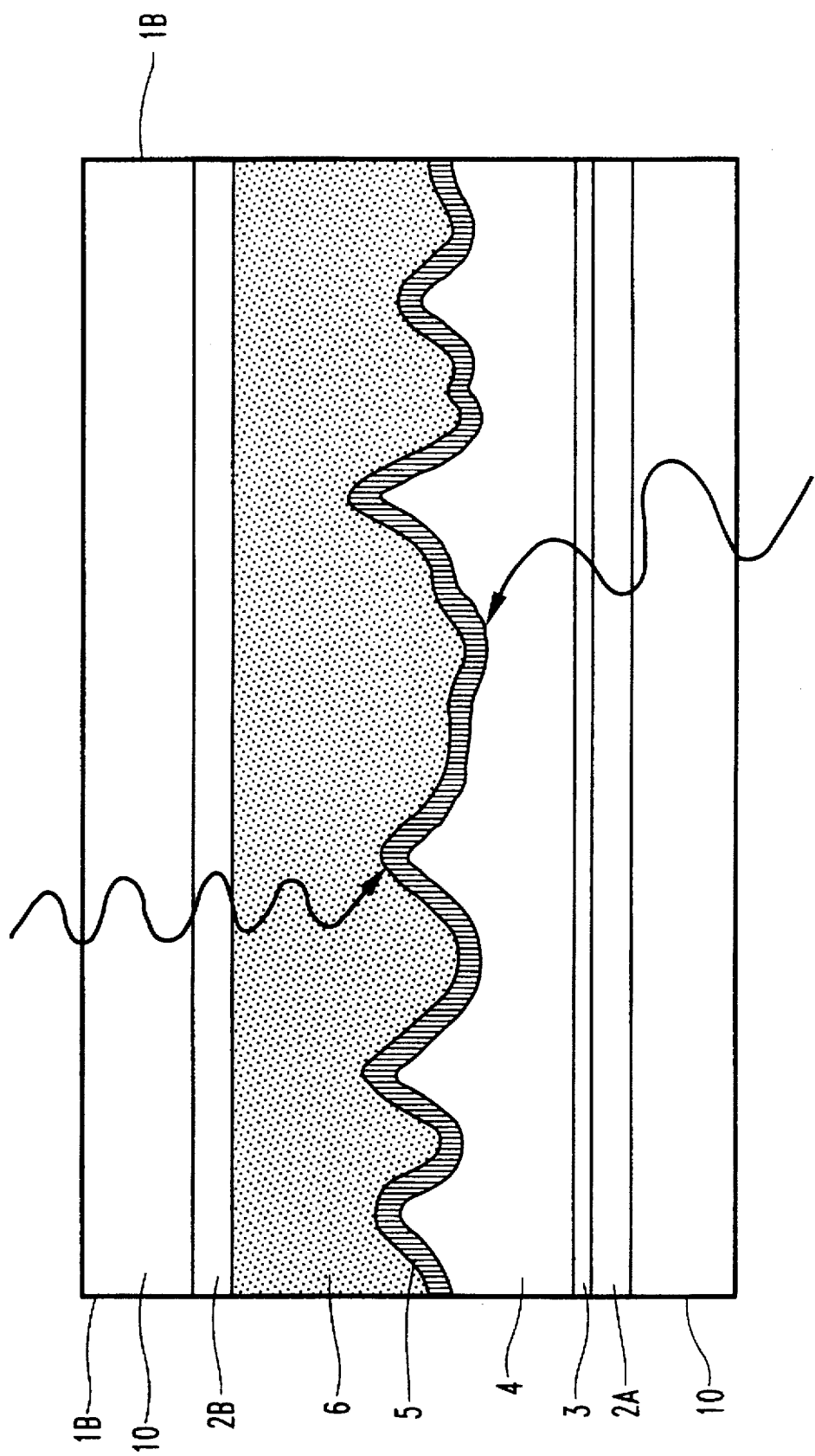

FIG. 1 shows a longitudinal cross-section through the photoelectrochemical cell 1. As is apparent from the Figure, the cell 1 is composed of several layers 2A, 2B, 3, 4, 5, and 6. The core of the cell 1 is formed by the layer serving as an electrode 4, the dye layer 5 and the electrolyte layer 6. According to the invention the electrode layer 4 is formed by a porous titanium dioxide layer. The latter is applied onto the layer 2A made of conductive glass, while a diffusion barrier 3 in the form of a non-porous titanium dioxide layer is situated therebetween. The non-porous titanium oxide layer 3 ensures that during annealing ions cannot diffuse out from the conductive glass layer and influence the porous titanium oxide layer 4. For the manufacture of this diffusion barrier 3, there be used may serve a solution of a titanium alkoxide in alcohol which is first applied, and after evaporation of the solvent in humid air, leaves behind a titanium oxide film which is less than 0.1 µm thick. The diffusion barrier 3 may also be deposited by heating of an aqueous solution of titanium(IV) chloride or deposited, at about 500° C., from dry air containing titanium(IV) chloride vapour. Adjacent the layer 4 is the dye layer 5. The latter is made of one of the known, previously mentioned substances, and is also formed by known means. Adjacent the layer 5 is the layer 6, formed by a liquid electrolyte. This layer 6 is delimited by an electrically conductive glass layer 2B. Next to each of the glass layers 2A and 2B is situated a transparent insulation layer 10. The lateral delimitations 1B of the cell 1 may also be formed by such insulation layers. For the manufacture of the cell 1 the titanium dioxide layer 3 is first applied onto the conductive glass layer 2. For the formation of the layer 4, which is also of titanium dioxide, a dispersion is first prepared. For this a titanium oxide powder is used, which is obtained by flame hydrolysis from titanium(IV) chloride. The particle size of the used powder is 15 nm. A dispersion of colloidal titanium dioxide particles is formed by mixing powdery titanium dioxide with a solvent. The solvent may be water, alcohols, polyalcohols, ether, carboxylic acids or amines. Particularly suitable solvents from these groups are methanol, ethanol, ethylene glycol, methoxyethanol, lactic acid and triethanolamine. The dispersion can be electrostatically stabilized by the addition of hydrochloric acid, nitric acid or carboxylic acid or sodium hydroxide solution, ammonia or tetraalkyl ammonium hydroxide. The dispersion may be sterically stabilized by the adsorption of a chelating agent in the form of acetylacetone, triethanolamine, lactic acid, polyalcohols, polymers in the form of polyethylene glycol, polyethylenimine, polyvinyl alcohol, so that after a long storage time no coagulation takes place. The concentration and along with it the viscosity of the dispersion to be prepared may be adjusted by simple dilution with the above mentioned solvents and so adapted to the selected coating process. To enable wetting of the already prepared non-porous titanium dioxide layer 3 by the colloidal dispersion, and to simplify its uniform distribution on the diffusion barrier 3, a surface-active substance is added to the dispersion. Preferably an anionic, cationic or non-ionic detergent is added therefor. Sodium oleate, cetyl trimethyl ammonium chloride or alkyl phenol polyethylene glycol ether are preferably used for this purpose. All methods suitable for this purpose may be used for the application of the titanium dioxide layer 4. After application of the titanium dioxide layer 4 the latter is annealed at a temperature of about 500° C. During this heat treatment the solvents are evaporated and the colloid particles sinter to a firmly adherent film. After the annealing of the porous titanium dioxide layer 4 the later is subjected to post treatment during which titanium dioxide is again deposited at least on the inner surfaces of the pores to increase the surface effect. By the deposition of further titanium dioxide on the colloid particles the purity, activity of the catalyst surface, therefore increased roughness, and thereby the size of the effective surface therefore are increased. For this post-treatment the porous titanium oxide layer 4 is immersed in an aqueous solution of titanium (IV) chloride from which titanium oxide is deposited on colloid particles acting as nuclei. According to the invention the deposition is electrochemical, in that a solution of 0.75% of $TiCl_3$ and 0.5% HCl is produced. By the addition of $NH_4OH$ the solution is set to a pH value of 2.1. The porous titanium(II) oxide layer 4 and a platinum electrode (not shown) are situated in this solution and together connected to a voltage source such that a current density of 30 $\mu A/cm^2$ is applied on the titanium dioxide layer. The deposition of further titanium dioxide on the colloid particles of the layer 4 lasts about 2 hours. The layer 4 is finally rinsed with HCl of pH value 1.5 and then with water, and subsequently subjected to heat treatment at a temperature between 400° and 420° C. The post-treatment may also be performed at 500° C. in a dry air stream loaded with titanium(IV) chloride.

We claim:

1. A method for the manufacture of a photoelectrochemical cell comprising a porous titanium dioxide electrode layer, an electrolyte, a chromophore layer situated between said electrode layer and said electrolyte, and respective transparent conductive layers outwardly delimiting each of said electrode layer and said electrolyte, the method comprising the step of forming the electrode layer by applying a layer of a dispersion of colloidal titanium dioxide particles in a solvent onto a substrate comprising one of said transparent conductive layers and then annealing the thus applied dispersion layer, so as to evaporate the solvent and sinter the colloidal particles to obtain a porous titanium dioxide layer firmly adherent to the substrate, wherein the method comprises the step of carrying out a post-treatment of the thus obtained porous titanium dioxide layer, so as to effect the deposition of further titanium dioxide on the colloidal particles of titanium dioxide, and wherein said post-treatment comprises the step of immersing the titanium dioxide layer in an aqueous solution of titanium (IV) chloride and the deposition is carried out electrochemically, comprising the steps of preparing an aqueous solution from 0.75% of $TiCl_3$ and 0.5% of HCl and setting it, by the addition of $NH_4OH$, to a pH value of 2.1, positioning the porous titanium oxide layer, together with a platinum electrode, in this solution and connecting it with the platinum electrode to a voltage source so that a current density of 30 $\mu A/cm^2$ is applied to the titanium oxide electrode for about 2 hours, so as to effect the deposition of titanium oxide on the colloidal particles of the titanium oxide layer and subsequently rinsing the titanium oxide layer with HCl having a pH value of 1.5 and then with water, and finally subjecting it to thermal treatment at a temperature of between 400° and 420° C.

2. A method for the manufacture of a photoelectrochemical cell comprising a porous titanium dioxide electrode layer, an electrolyte, a chromophore layer situated between said electrode layer and said electrolyte, and respective transparent conductive layers outwardly delimiting each of said electrode layer and said electrolyte, the method comprising the step of forming the electrode layer by applying a layer of a dispersion of colloidal titanium dioxide particles in a solvent onto a substrate comprising one of said transparent conductive layers and then annealing the thus applied dispersion layer, so as to evaporate the solvent and sinter the colloidal particles to obtain a porous titanium dioxide layer firmly adherent to the substrate, wherein the method comprises the step of carrying out a post-treatment of the thus obtained porous titanium dioxide layer, so as to effect the deposition of further titanium dioxide on the colloidal particles of titanium dioxide, and wherein said post-treatment comprises the step of exposing the titanium dioxide electrode layer, at a temperature of 500° C., to a stream of dry air loaded with titanium (IV) chloride.

3. A method for the manufacture of a photoelectrochemical cell comprising a porous titanium dioxide electrode layer, an electrolyte, a chromophore layer situated between said electrode layer and said electrolyte, and respective transparent conductive layers outwardly delimiting each of said electrode layer and said electrolyte, the method comprising the step of forming the electrode layer by applying a layer of a dispersion of colloidal titanium dioxide particles in a solvent onto a substrate comprising one of said transparent conductive layers and then annealing the thus applied dispersion layer, so as to evaporate the solvent and sinter the colloidal particles to obtain a porous titanium dioxide layer firmly adherent to the substrate, wherein the method comprises the step of carrying out a post-treatment of the thus obtained porous titanium dioxide layer, so as to effect the deposition of further titanium dioxide on the colloidal particles of titanium oxide, said deposition being so made that also the inner surfaces of the pores of said porous titanium dioxide layer are coated with said further titanium dioxide, thus increasing the effective surface of the titanium dioxide electrode layer.

4. A method for the manufacture of a photoelectrochemical cell comprising a porous titanium dioxide electrode layer, an electrolyte, a chromophore layer situated between said electrode layer and said electrolyte, and respective transparent conductive layers outwardly delimiting each of said electrode layer and said electrolyte, the method comprising the step of forming the electrode layer by applying a layer of a dispersion of colloidal titanium dioxide particles in a solvent onto a substrate comprising one of said transparent conductive layers and then annealing the thus applied dispersion layer, so as to evaporate the solvent and sinter the colloidal particles to obtain a porous titanium dioxide layer firmly adherent to the substrate, wherein the method further comprises the step of providing a diffusion barrier between said porous titanium dioxide electrode layer and said substrate.

5. A method according to claim 4, wherein said diffusion barrier is a non-porous titanium dioxide layer.

6. A method according to any one of claims 1 to 4, wherein the dispersion of colloidal titanium dioxide particles is formed by mixing a titanium dioxide powder with a solvent.

7. A method according to claim 6, wherein a titanium dioxide powder, having a particle size of 15 nm, produced by flame hydrolysis from titanium (IV) chloride, is used for the formation of the dispersion of colloidal titanium dioxide particles.

8. A method according to claim 6, wherein a material selected from the group consisting of water, alcohols, polyalcohols, ether, carboxylic acids, and amines is used as a solvent for the preparation of the dispersion.

9. A method according to claim 6, wherein a material selected from the group consisting of methanol, ethanol, ethylene glycol, glycerol, methoxyethanol, lactic acid, and triethanol amine is used as the solvent.

10. A method according to claim 6, wherein admixtures selected from the group consisting of acids, bases, and chelating agents are added for the preparation of an electrostatically or sterically stabilized dispersion.

11. A method according to claim 6, wherein a material selected from the group consisting of hydrochloric acid, nitric acid solution, carboxylic acid solution, sodium hydroxide solution, ammonia, and tetraalkyl ammonium hydroxide is added to the dispersion to obtain electrostatic stability, and that steric stabilization of the dispersion is achieved by adsorption of a material selected from the group consisting of acetylacetone, triethanolamine, lactic acid, polyalcohols, polyethylene glycol polymers, polyethylene imine polymers, and polyvinyl alcohol polymers.

12. A method according to claim 6, wherein a material selected from the group consisting of anionic, cationic or nonionic detergent in the form of sodium oleate, cetyl trimethyl ammonium chloride, and alkyl phenol polyethylene glycolether is added to the dispersion.

13. A method according to claim 6, wherein the electrode layer deposited from the dispersion, is annealed at a temperature of 500° C. whereby the solvent evaporated and colloidal $TiO_2$ particles are sintered to a strong film.

14. A photoelectrochemical cell comprising a porous titanium dioxide electrode layer, an electrolyte layer, a chromophore layer situated between said electrode layer and said electrolyte layer, and respective transparent electrically conductive layers outwardly delimiting each of said electrode layer and said electrolyte, wherein a diffusion barrier is provided between said electrode layer and the transparent electrically conductive layer outwardly delimiting said electrode.

* * * * *

UNITED STATES PATENT AND TRADEMARK OFFICE
CERTIFICATE OF CORRECTION

PATENT NO. : 5,525,440
DATED : June 11, 1996
INVENTOR(S) : Kay et al

It is certified that error appears in the above-indentified patent and that said Letters Patent is hereby corrected as shown below:

In column 2, line 40, please change "there be used may" to --there may be used--.

In column 2, line 40, please delete "serve".

In column 3, lines 29 and 30, please delete "therefore increased".

In column 3, line 38, please change "titanium (II) oxide" to --titanium dioxide--.

Signed and Sealed this

Tenth Day of December, 1996

Attest:

BRUCE LEHMAN

Attesting Officer  Commissioner of Patents and Trademarks